2 Sheets—Sheet 1.

J. M. BRONSON.

REMOVABLE BOOK COVER.

No. 10,615. Reissued June 23, 1885.

Witnesses:
W. C. McArthur
A. L. Paré

Inventor.
James M. Bronson per H. Harrison
Attorney.

N. PETERS. Photo-Lithographer, Washington, D. C.

2 Sheets—Sheet 2.

J. M. BRONSON.

REMOVABLE BOOK COVER.

No. 10,615. Reissued June 23, 1885.

Witnesses:
H. C. McArthur
A. S. Paré

Inventor:
James M. Bronson
per
H. Harrison
Attorney.

N. PETERS, Photo-Lithographer, Washington, D. C

UNITED STATES PATENT OFFICE.

JAMES M. BRONSON, OF CHICAGO, ILLINOIS.

REMOVABLE BOOK-COVER.

SPECIFICATION forming part of Reissued Letters Patent No. 10,615, dated June 23, 1885.

Original No. 290,846, dated December 25, 1883. Application for reissue filed July 25, 1884.

*To all whom it may concern:*

Be it known that I, JAMES M. BRONSON, a citizen of the United States of America, residing at Chicago, in the county of Cook and State of Illinois, have invented a new and useful Improvement in Removable Book-Covers, of which the following is a specification, to wit:

This invention relates to improvements in removable covers for books; and it consists in the peculiar construction of the book and its removable cover, whereby when opened out the book will rest flat upon a desk or table and will not form a "roll" at the point where the leaves are sewed together, substantially as and for the purpose hereinafter set forth.

In order to enable others skilled in the art to which my invention appertains to make and use the same, I will now proceed to describe its construction, referring to the accompanying drawings, in which—

Figure 1:
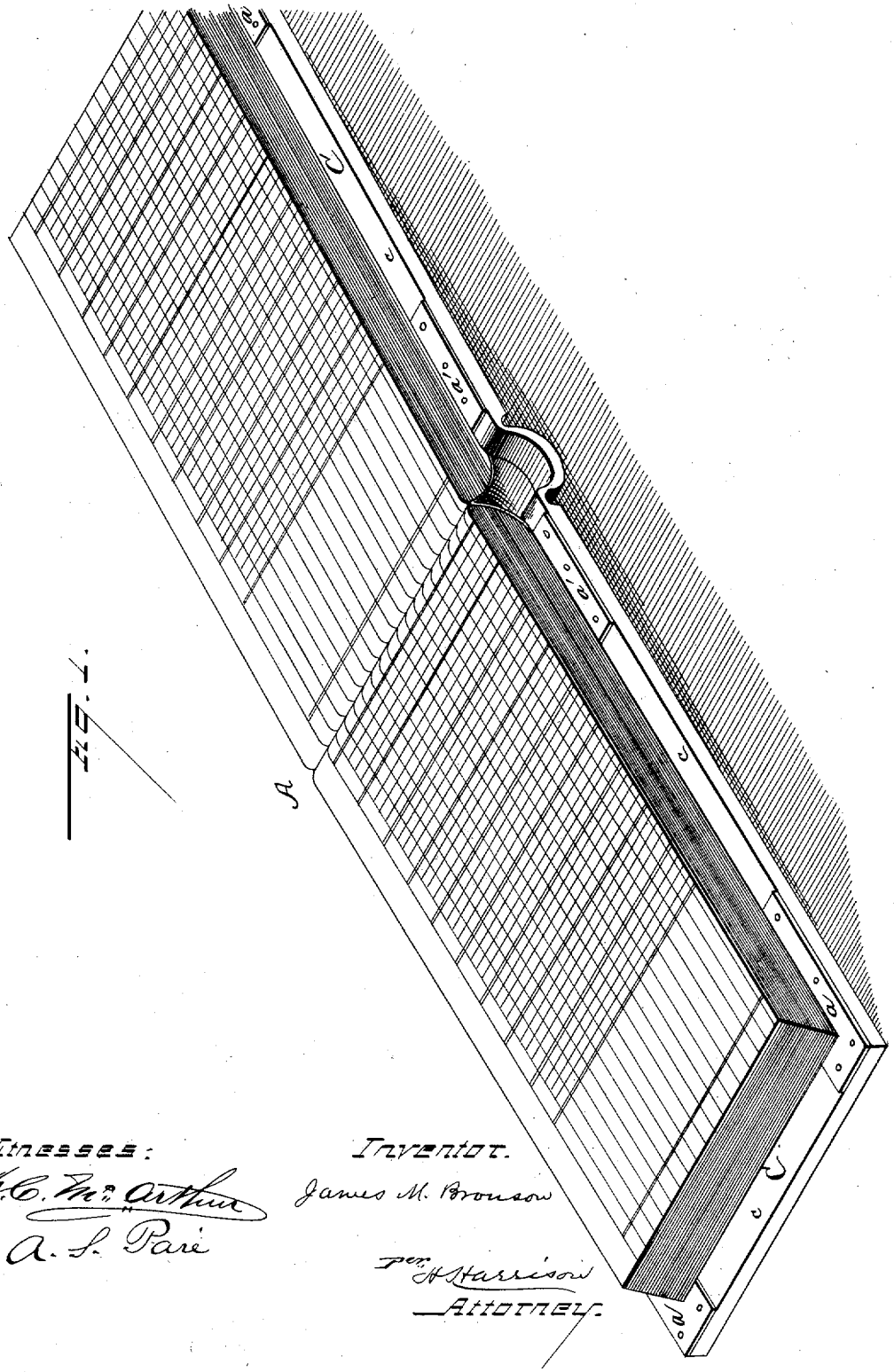
Figure 2:
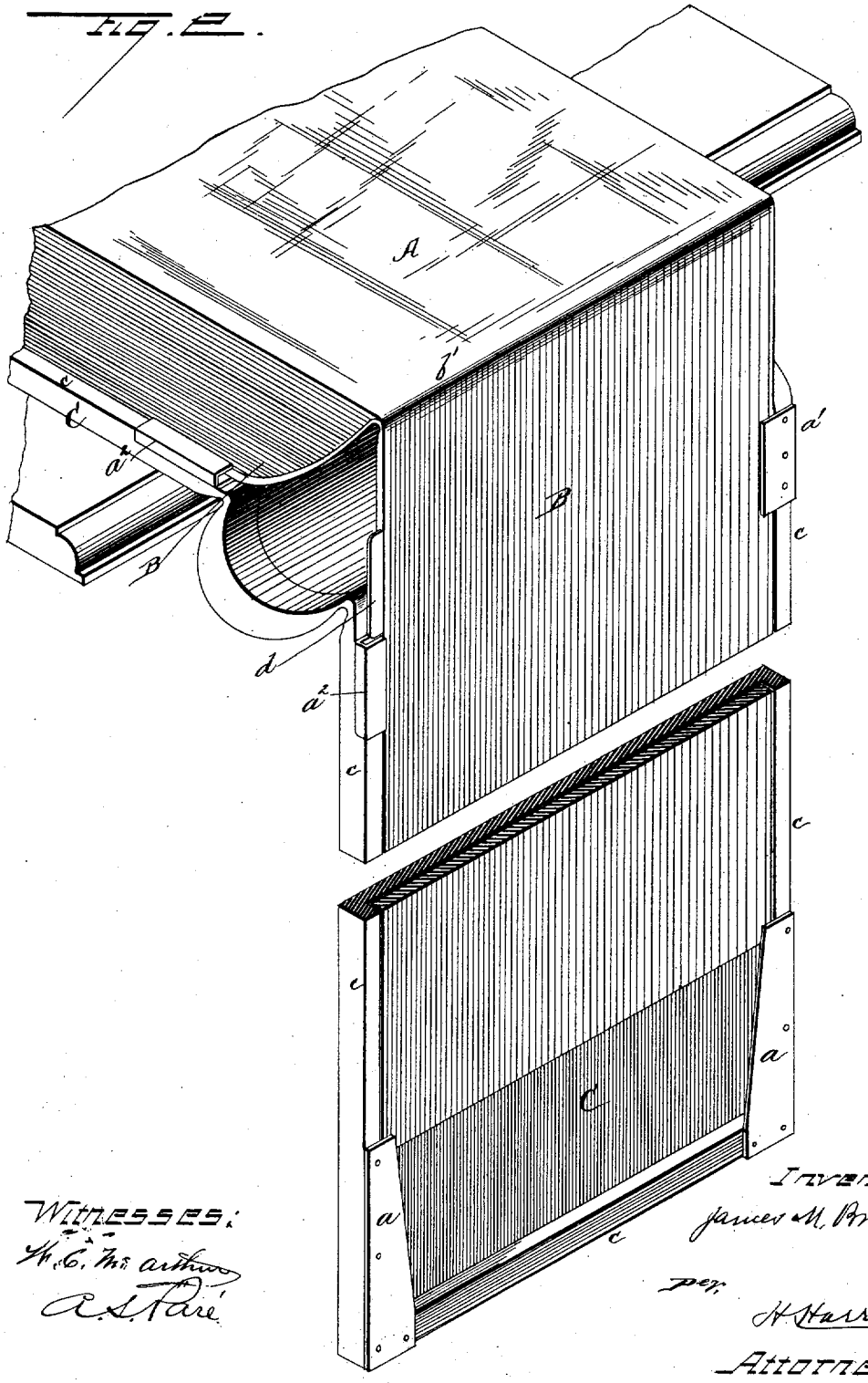

Figure 1 is a perspective view of my book opened out for use, and Fig. 2 a similar view of the book closed and one of the covers turned back and partly removed.

A represents a blank-book of any usual size and form, the inner cover of which, B, is of heavy "board," cut the same size as the pages of the book, and extending at its inner end close up to the edge of the first section, as seen at *b'*, Fig. 2. To the book thus formed I fit a removable cover, C, the boards of which are made longer and wider than the inner cover, B, of the book, and are formed with a flange, *c*, around their edges, which is of a height corresponding to the thickness of the inner cover, and which forms a socket in which this cover rests. The outer covers are supplied with pieces of metal *a a*, beneath which the outer ends of the covers B B are held, and the inner ends are secured on one edge by a strip of metal, *a'*, secured to one of the flanges *c* and overlapping the inner cover, B, and upon the opposite side by a metal groove or box, $a^2$, secured to the cover C flush with its flange *c*, and into which slides a short strip or tongue of metal, *d*, secured in and projecting from the edge of the inner cover, B, as shown by Fig. 2.

To apply the cover, one side of the book is slipped into the cover and the opposite one thrown back, as shown by Fig. 2, the outer ends of the inner cover, B, slipped beneath the pieces *a a* on the outer cover, and the inner edge on one side beneath the strip *a'*. The inner cover, B, is then pressed down into the socket between the flanges *c*, and the cover raised, when the inner cover slips forward into place, the strip *d* engaging with the metal groove $a^2$, and securing the whole firmly together.

In a book as ordinarily made when opened out the point in the center at which the leaves are joined rises in a roll upon each side and makes it very difficult to write, except when held down by one hand, and this strain soon breaks the book. By my construction, however, when the book is opened out the outer cover slides out upon the inner one, somewhat like, but at a shorter distance than, that in the position shown by Fig. 2. At the same time the stiff inner cover, B, extending up to the first section, acts, when held by the metal guide-pieces of the cover, to lift the book at this point and throw it up in the center, allowing the leaves to open out flat and even in the position shown by Fig. 1, where it is supported by the inner covers, B B, with no strain upon the sewing. This not only facilitates the ease of writing, but forms a stronger and better book, which will not break in the hinge from frequent use, and which may be slipped out of its cover at any time and filed away, strongly bound, for future reference.

Having thus fully described my invention, what I claim as new, and desire to secure by Letters Patent, is—

1. A removable cover for books, constructed with integral flanges around its edges to form a socket of a depth sufficient to receive the inner book-cover and provided with overlapping pieces at the outer and inner corners, which hold the book firmly in place, but allow it to slide freely endwise, substantially as shown and described.

2. In a detachable book and cover, the book A, having stiff covers B, the inner ends of which extend close up to the sewing, and having a projecting piece of metal, *d*, on one edge, in combination with the cover C, provided with flanges *c c*, forming a socket in which the inner book-cover is recessed, the retaining strips of metal $a$ $a'$, and metal groove or guide $a^2$, all constructed and arranged to operate substantially as and for the purpose set forth.

3. In a detachable cover for books, the cover C C, forming sockets in which the inner book-covers, B B, are recessed, in combination with the overlapping metal corner pieces $a$ $a$ at the outer corners and the metal strips $a'$ at the inner corners, whereby the covers are firmly held in place, but the book left free to slide within the socketed outer cover, substantially as and for the purpose set forth.

4. The combination, with the book-cover C, of the metal pieces $a$ $a'$ $a^2$, substantially as and for the purpose set forth.

5. The inside book-cover, B, provided with a projecting tongue, $d$, on its edge, substantially as and for the purpose set forth.

In testimony whereof I affix my signature in presence of two witnesses.

JAMES M. BRONSON.

Witnesses:

W. C. McARTHUR,

CHAS. KRESSMANN.